United States Patent
Greiner et al.

(10) Patent No.: US 9,702,605 B2
(45) Date of Patent: Jul. 11, 2017

(54) METHOD FOR ADJUSTING FAN AND COMPRESSOR POWER FOR A VEHICLE CABIN HEATING SYSTEM

(71) Applicant: Ford Global Technologies, LLC, Dearborn, MI (US)

(72) Inventors: Christopher Mark Greiner, Birmingham, MI (US); Michael Steven Wallis, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 220 days.

(21) Appl. No.: 14/098,328

(22) Filed: Dec. 5, 2013

(65) Prior Publication Data

US 2015/0158369 A1    Jun. 11, 2015

(51) Int. Cl.
| | |
|---|---|
| F25B 1/00 | (2006.01) |
| F25B 49/00 | (2006.01) |
| G01K 13/00 | (2006.01) |
| F25D 21/06 | (2006.01) |
| F25B 49/02 | (2006.01) |
| F25D 17/06 | (2006.01) |
| B60H 1/32 | (2006.01) |
| F25B 30/02 | (2006.01) |

(52) U.S. Cl.
CPC ......... *F25B 49/022* (2013.01); *B60H 1/3213* (2013.01); *F25B 30/02* (2013.01); *F25B 49/02* (2013.01); *F25D 17/067* (2013.01); *B60H 2001/325* (2013.01); *B60H 2001/3282* (2013.01); *F25B 2700/15* (2013.01); *F25B 2700/173* (2013.01); *F25B 2700/1933* (2013.01); *F25B 2700/2116* (2013.01)

(58) Field of Classification Search
CPC ... F25B 49/022; F25D 17/067; B60H 1/3213; B60H 2001/325; B60H 2001/3282
USPC .... 61/115, 126, 129, 155; 62/115, 126, 129, 62/155
See application file for complete search history.

(56) References Cited

U.S. PATENT DOCUMENTS

| | | | | |
|---|---|---|---|---|
| 4,364,237 A | * | 12/1982 | Cooper | F24F 11/085 62/160 |
| 4,383,628 A | * | 5/1983 | Hiller | B60R 9/045 211/182 |
| 5,220,808 A | * | 6/1993 | Mayer | B60H 1/00371 62/244 |
| 5,257,508 A | * | 11/1993 | Powell | B60H 1/3205 62/180 |
| 5,782,101 A | * | 7/1998 | Dennis | F25B 5/02 62/160 |
| 6,077,158 A | * | 6/2000 | Lake | B60H 1/00278 165/249 |

(Continued)

OTHER PUBLICATIONS

Ragazzi, Franco, "Method and System for Heating a Vehicle," U.S. Appl. No. 14/142,324, filed Dec. 30, 2013, 37 pages.

*Primary Examiner* — Henry Crenshaw
(74) *Attorney, Agent, or Firm* — David Kelley; McCoy Russell LLP

(57) ABSTRACT

Systems and methods for operating a heater for a passenger cabin of a vehicle. In one example, fan speed of an evaporator cooling fan is adjusted to improve heating efficiency. In particular, fan speed is incrementally increased and maintained at the higher speed if output power of a compressor is reduced by more than an amount of power used to incrementally increase the fan speed.

14 Claims, 5 Drawing Sheets

(56) References Cited

U.S. PATENT DOCUMENTS

| | | | |
|---|---|---|---|
| 6,487,869 B1* | 12/2002 | Sulc | B60H 1/3205 62/228.4 |
| 8,209,073 B2 | 6/2012 | Wijaya et al. | |
| 2002/0112489 A1* | 8/2002 | Egawa | B60H 1/3208 62/133 |
| 2003/0085031 A1 | 5/2003 | Forrest et al. | |
| 2003/0233839 A1* | 12/2003 | Hirose | B60H 1/3205 62/186 |
| 2004/0093149 A1* | 5/2004 | Hara | B60H 1/00885 701/104 |
| 2005/0183434 A1* | 8/2005 | Iritani | F25B 31/006 62/228.1 |
| 2008/0209925 A1* | 9/2008 | Pham | F25B 49/005 62/126 |
| 2010/0286830 A1* | 11/2010 | Wijaya | B60H 1/3205 700/276 |
| 2011/0016893 A1* | 1/2011 | Dawes | F25B 49/02 62/89 |
| 2011/0144944 A1* | 6/2011 | Pham | F04C 28/00 702/182 |
| 2012/0117993 A1* | 5/2012 | Takahashi | B60H 1/00907 62/132 |
| 2012/0137713 A1* | 6/2012 | Duraisamy | B60P 3/20 62/228.1 |
| 2012/0210736 A1* | 8/2012 | Rockenfeller | F25B 7/00 62/115 |
| 2012/0318012 A1 | 12/2012 | Choi et al. | |

* cited by examiner

METHOD FOR ADJUSTING FAN AND COMPRESSOR POWER FOR A VEHICLE CABIN HEATING SYSTEM

FIELD

The present description relates to method for adjusting evaporator fan power and compressor power for a heat pump that provides heat to a cabin of a passenger vehicle. The method may be useful for electric and hybrid vehicles.

BACKGROUND AND SUMMARY

Vehicle passenger cabins may be heated using internal combustion engine waste heat that is transferred to engine coolant. Specifically, passenger cabin air and fresh air are blown across a heater core in which engine coolant circulates. Heat is transferred from the engine coolant to the cabin air and the cabin air is circulated about the cabin. However, some vehicles do not include an internal combustion engine, or the internal combustion engine may be stopped to conserve fuel so that little engine waste heat may be available to warm the passenger cabin. One way to heat cabin air within a passenger compartment of an electric or hybrid vehicle is to heat the cabin air via a heat pump. The heat pump extracts heat from ambient air outside of the vehicle and transfers the heat to air in the passenger compartment. The heat pump is operated by using electrical energy to rotate a compressor and a fan that directs air over an evaporator. If the compressor and/or fan are driven at speed that are above or below desired speeds, the heat pump may consume more energy than is desired and it may provide more or less heat than is desired to the passenger cabin. Consequently, the vehicle in which the heat pump operates may provide less driving range than is desired due to the fan and/or compressor consuming excess electrical energy from the vehicle.

The inventors herein have recognized the above-mentioned disadvantages and have developed a method for operating heat pump of a vehicle, comprising: increasing an evaporator cooling fan input power by a first amount to a first input power and maintaining the evaporator cooling fan input power at the first input power in response to compressor input power decreasing by more than the first amount.

By weighing adjusting in evaporator fan power in response to compressor output power, it may be possible to provide the technical result of ascertaining whether or not it is beneficial to adjust evaporator fan input power to conserve energy used to operate a heat pump while providing a desired level of cabin heat. In particular, if increasing evaporator fan input power allows compressor output power to be reduced by an amount that is greater than the increase of evaporator fan input power speed while providing a desired level of cabin heat, the evaporator fan input power is increased. Otherwise, the evaporator fan input power may be maintained.

The present description may provide several advantages. Specifically, the approach may improve heat pump operating efficiency. Further still, the approach may extend vehicle driving range. Further still, the approach may provide a desired level of cabin heating while extending vehicle driving range.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
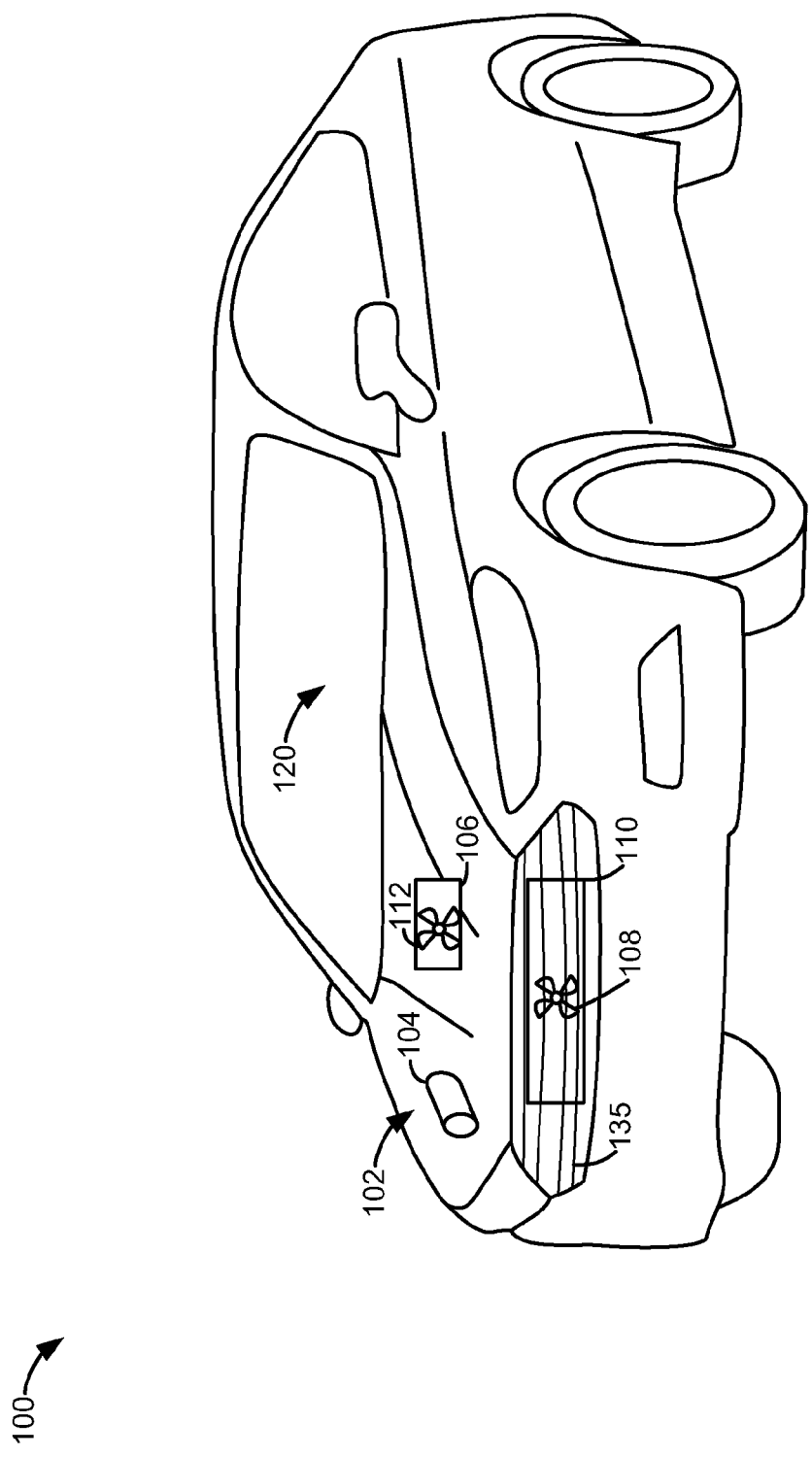
FIG. 1 shows an example vehicle that includes a heat pump.

The present description is related to improving efficiency of a vehicle cabin heating system. The vehicle may be a passenger vehicle as shown in FIG. 1 or a commercial vehicle. The vehicle cabin heating system may include a heat pump as is shown in the heating system illustrated in FIG. 2. The vehicle cabin heating system may operate as shown in FIG. 3 according to the method of FIGS. 4 and 5.

Referring to FIG. 1, an example vehicle 100 that includes a heat pump 102 is shown. Heat pump 102 includes a compressor 104 that compresses a refrigerant for extracting heat from ambient air to heat passenger cabin 120. Heat pump 102 also includes an evaporator 110 and an evaporator fan 108. Evaporator fan 108 blows ambient air across evaporator 110 to extract heat from the ambient air. Heat pump 102 also includes condenser 106 and condenser fan 112. Ambient and/or cabin air is blown over condenser 106 by condenser fan 112 to cool refrigerant within heat pump 102 and heat passenger cabin 120. A more detailed view of heat pump 102 is provided in FIG. 2. Shutters 135 may be opened and closed to reduce evaporator fan power.

Figure 2:
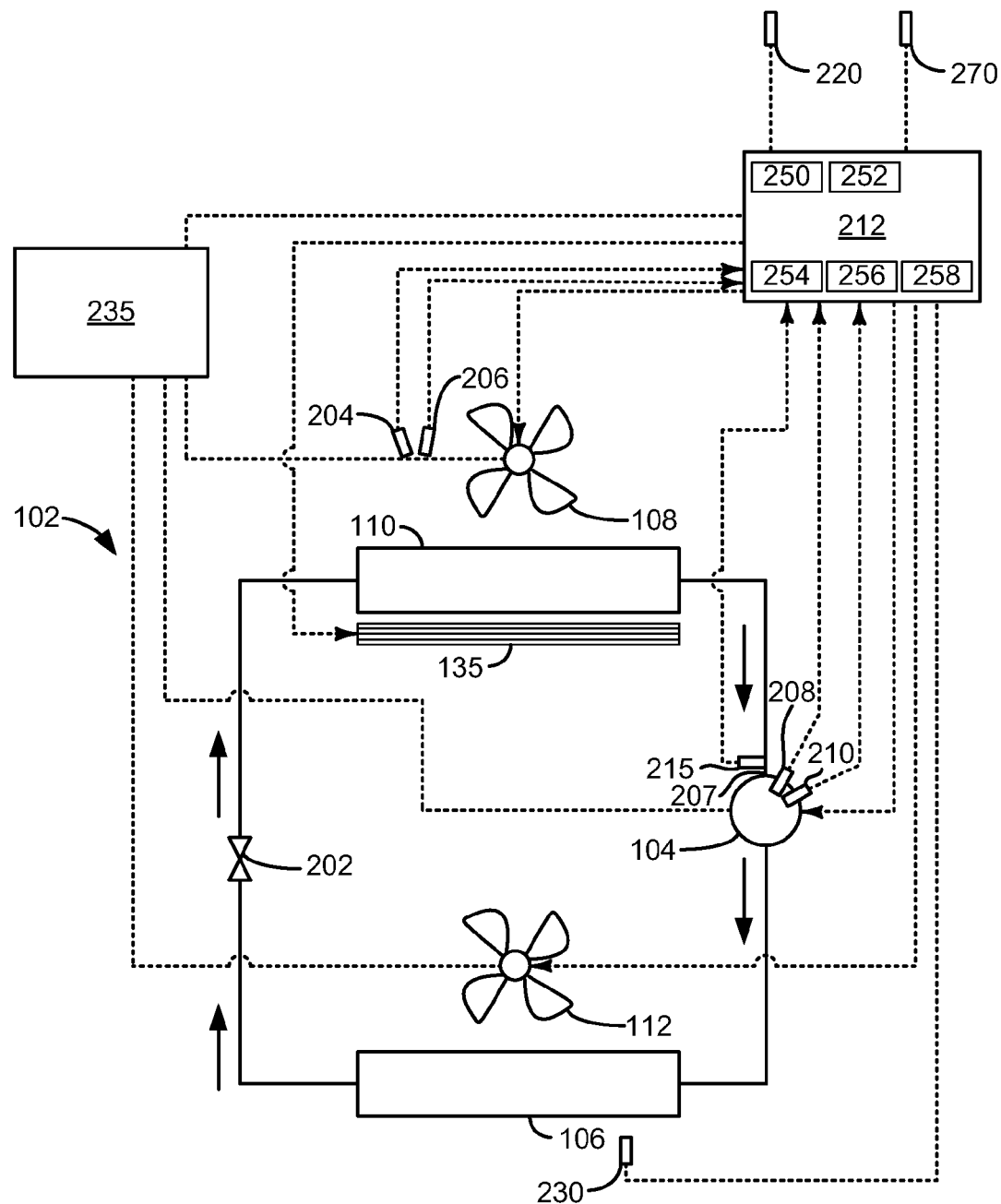
FIG. 2 shows an example vehicle cabin heating system.
Figure 3:
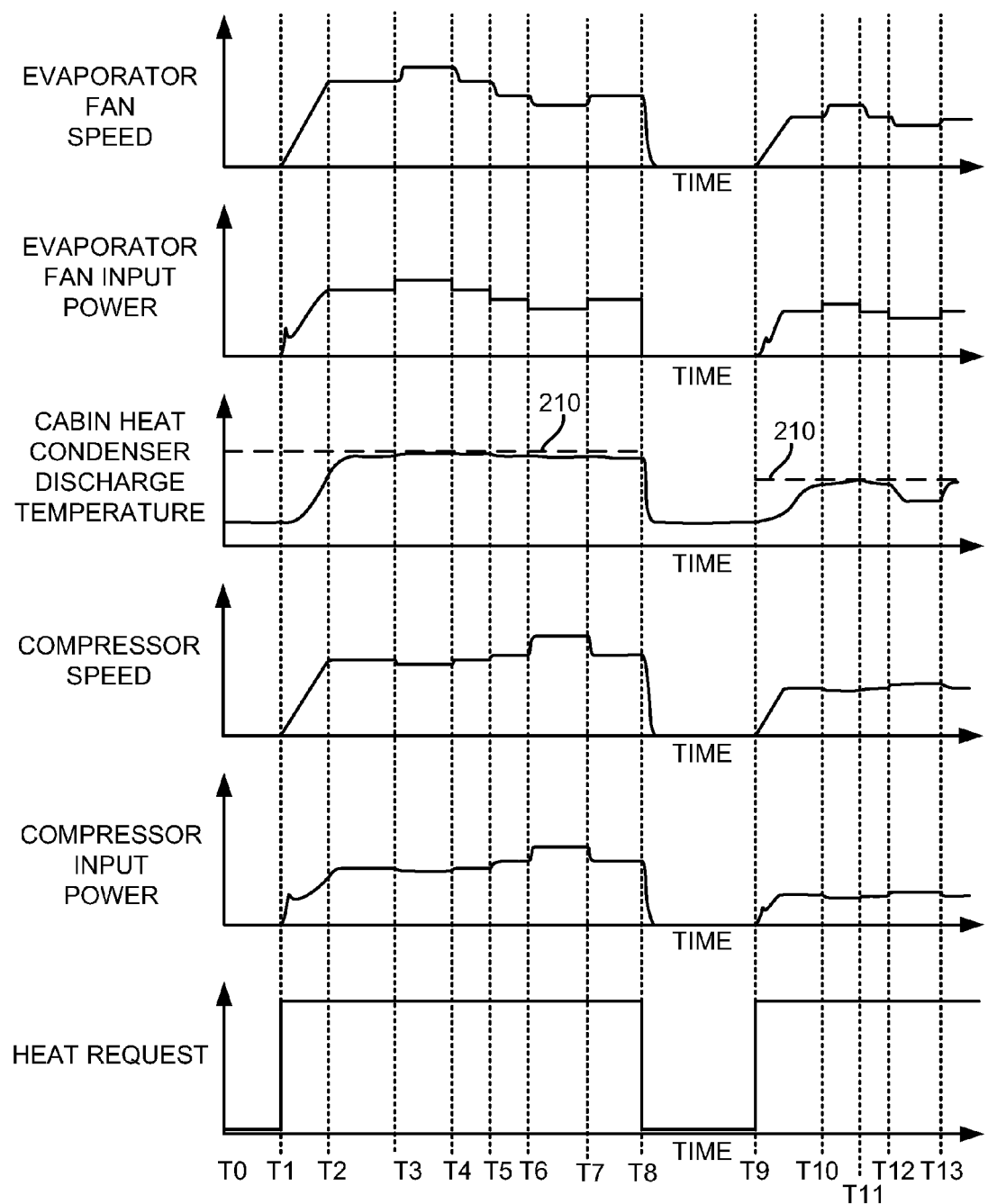
FIG. 3 shows an example vehicle cabin heating sequence.

Referring now to FIG. 2, an example schematic diagram of a vehicle cabin heating system including heat pump 102 is shown. The vehicle cabin heating system may operate according to the operating sequence shown in FIG. 3. Further, the method of FIGS. 4 and 5 may be included in the vehicle cabin heating system as executable instructions stored in non-transitory memory. Electrical interconnections are shown as dashed lines while devices and fluidic interconnections are shown as solid lines.

Vehicle cabin heating system includes a controller 212 having a central processing unit 250, inputs and outputs 252, volatile memory 254, non-transitory memory 256, and keep alive memory 258. Controller 212 receives inputs and provides outputs to operate heat pump 102.

Controller 212, evaporator fan 108, condenser fan 112, and compressor 104 are supplied electrical power by electrical energy storage device (e.g., battery) 235. An amount of electrical power supplied to evaporator fan 108 may be determined via electrical current sensor 204 and voltage sensor 206 (e.g., P(power)=I(current) multiplied by V(voltage)). Similarly, electrical power supplied to compressor 104 may be determined via electrical current sensor 208 and voltage sensor 210. Compressor pressurizes refrigerant and causes the refrigerant to flow in the direction indicated by the arrows. In particular, compressor 104 supplies pressurized refrigerant to condenser 106 where ambient and passenger cabin air are passed over condenser to remove heat from the refrigerant and heat the passenger cabin. The refrigerant enters expansion valve 202 where it expands and flows into evaporator 110. Evaporator fan 108 blows ambient air over evaporator 110 to extract heat from ambient air and transfer the heat to the refrigerant. The warmed refrigerant returns to compressor 104 where it is pumped back to condenser 106.

Ambient air temperature may be sensed via temperature sensor 220. Vehicle speed may be sensed via vehicle speed sensor 270. In some examples, speed of evaporator fan 108 may be adjusted responsive to vehicle speed in addition to other conditions. Discharge temperature of condenser 106 may be measured via temperature sensor 230. Pressure sensor 215 provides an indication of pressure at suction inlet 207 of compressor 104. Controller 212 may adjust speed of compressor 104 to control pressure at suction inlet 207. Additionally, controller 212 may adjust a position of shutters 135 to reduce fan power by allowing ambient air to pass through evaporator 110 using vehicle motion to move air across evaporator 110. In some examples, shutters 135 may be positioned on the bottom side of vehicle 100.

In this way, a vehicle's passenger cabin may be heated via transferring heat from ambient air to the passenger cabin 120. It should also be noted that heat pump 102 may be operated in a reverse cycle to cool passenger cabin 120.

Referring now to FIG. 3, a plot of an example vehicle cabin heating sequence is shown. The cabin heating sequence of FIG. 3 may be performed via the system of FIGS. 1 and 2 according to the method of FIGS. 4 and 5. Vertical markers T0-T13 represent times of interest during the cabin heating sequence.

The first plot from the top of FIG. 3 is a plot of evaporator fan speed versus time. The X axis represents time and time increases from the right side of the plot to the left side of the plot. The Y axis represents evaporator fan speed and evaporator fan speed increases in the direction of the Y axis arrow.

The second plot from the top of FIG. 3 is a plot of evaporator fan input power versus time. The X axis represents time and time increases from the right side of the plot to the left side of the plot. The Y axis represents evaporator input power and evaporator input power increases in the direction of the Y axis arrow.

The third plot from the top of FIG. 3 is a plot of cabin condenser discharge temperature versus time. The X axis represents time and time increases from the right side of the plot to the left side of the plot. The Y axis represents cabin condenser discharge temperature and cabin condenser discharge temperature increases in the direction of the Y axis arrow. Horizontal line 210 represents a desired cabin heater discharge temperature.

The fourth plot from the top of FIG. 3 is a plot of compressor speed versus time. The X axis represents time and time increases from the right side of the plot to the left side of the plot. The Y axis represents compressor speed and compressor speed increases in the direction of the Y axis arrow.

The fifth plot from the top of FIG. 3 is a plot of compressor input power versus time. The X axis represents time and time increases from the right side of the plot to the left side of the plot. The Y axis represents compressor input power and compressor input power increases in the direction of the Y axis arrow.

The sixth plot from the top of FIG. 3 is a plot of a cabin heat request versus time. The cabin heat request may be made by a driver or a climate control system. Heat is being requested when the cabin heat request trace is at a higher level. Heat is not requested when the cabin heat request trace is at a lower level.

At time T0 the cabin heat request is not asserted. Since the driver is not calling for heat to the vehicle passenger cabin, the evaporator fan speed is zero, the evaporator fan power is zero, the compressor speed is zero, and the compressor input power is zero. The cabin heat exchanger discharge temperature is at the same temperature as the cabin temperature (not shown).

At time T1, the driver or a climate controller asserts the heat request. The evaporator fan speed and compressor speed are ramped up to predetermined speeds based on the requested cabin temperature. The evaporator fan input power and the compressor input power are increased in response to the heat request. The evaporator fan input voltage and current are adjusted to predetermined values that are expected to provide the desired fan speed. Similarly, the compressor voltage and current are adjusted to predetermined values that are expected to provide the desired compressor speed. The cabin heat condenser discharge temperature begins to increase as the compressor and evaporator fan speeds increase.

At time T2, the compressor speed and the evaporator fan speed reach their respective commanded speeds. The heat request remains asserted and the evaporator fan input power and the compressor input power level off to constant values.

At time T3, the heat pump controller begins to adjust evaporator fan speed and compressor speed to reduce heat pump power consumption while providing the desired cabin temperature. In particular, the evaporator fan input power is increased a predetermined amount which causes the evaporator fan speed to increase. The predetermined amount may vary with desired cabin temperature and other heat pump operating conditions. The compressor speed is reduced by a proportional/integral controller that adjusts compressor speed to provide a desired compressor suction inlet pressure. The desired compressor suction inlet pressure may vary with desired cabin temperature and other heat pump operating conditions. The compressor input power is reduced to lower the compressor speed. The reduction in compressor power is compared to the increase in evaporator fan power. In this example, the increase in fan power is greater than the resulting decrease in compressor power that results from increasing the evaporator fan speed. Therefore, the controller determines that increasing evaporator fan speed is not beneficial in this example.

At time T4, the evaporator fan input power is returned to the power input to the evaporator fan at the time just before time T3. The compressor input power is increased to increased compressor speed so that a desired compressor suction inlet pressure is provided. The cabin heat request remains asserted and the heat condenser discharge temperature remains near the desired condenser discharge temperature.

At time T5, the evaporator fan input power is reduced a predetermined amount since increasing the evaporator input power did not result in a desired reduction in compressor power. The evaporator fan speed decreases in response to the reduction in evaporator fan input power. The compressor input power is increased a small amount to provide the desired compressor suction inlet pressure. The compressor speed is increased in response to the compressor input power being increased. The decrease in evaporator fan input power is compared to the increase in compressor input power. In this instance, the reduction in evaporator fan power is greater than the increase in compressor input power. Therefore, the evaporator fan power is maintained at the lower input power since there is a net reduction in heat pump power. The heat request remains asserted and the condenser discharge temperature remains near the desired condenser discharge temperature.

At time T6, the evaporator fan input power is reduced yet another predetermined amount since the previous reduction in evaporator fan power resulted in a net decrease in heat pump power consumption. The evaporator fan speed decreases in response to the reduction in evaporator fan input power. The compressor input power is increased to provide the desired compressor suction inlet pressure. The compressor speed is increased in response to the increase in compressor input power. In this instance, the reduction in evaporator fan speed input power is less than the increase in compressor input power. As a result, at time T7, the evaporator fan power is returned to its previous value just before time T6. Thus, the reduction in evaporator fan input power at time T6 resulted in a net increase in heat pump power. The heat request remains asserted and the condenser discharge temperature remains near the desire condenser discharge temperature.

At time T7, the evaporator fan's input power is returned to its input power level at the time just before time T6 since a net reduction in heat pump power did not result from a reduction of evaporator input power. The evaporator fan speed is increased in response to the increase of evaporator fan input power. The proportional/integral controller adjusts the compressor's input power to its input power level at the time just before time T6. The compressor speed is reduced in response to the reduction of compressor input power. The cabin heat request remains asserted and the condenser discharge temperature remains near the desired condenser discharge temperature.

At time T8, the heat request is transitioned to a not asserted level in response to a driver or climate controller. The evaporator input power and compressor input power are reduced to zero in response to the absence of a cabin heat request. The compressor speed and the evaporator fan speed are reduced to zero. Further, the condenser discharge temperature is reduced to cabin temperature.

At time T9, the driver or a climate controller asserts the heat request. The heat request is accompanied by a lower desired condenser discharge temperature than the desired condenser discharge temperature at time T1. The desired condenser discharger temperature is based on the desired cabin temperature. The evaporator fan speed and compressor speed are ramped up to predetermined speeds based on the requested cabin temperature. The evaporator fan input power and the compressor input power are increased in response to the heat request. The evaporator fan input voltage and current are adjusted to predetermined values that are expected to provide the desired fan speed. Also, the compressor voltage and current are adjusted to predetermined values that are expected to provide the desired compressor speed. The cabin heat condenser discharge temperature begins to increase as the compressor and evaporator fan speeds increase.

Between time T9 and time T10, the compressor speed and the evaporator fan speed reach their respective commanded speeds. The heat request remains asserted and the evaporator fan input power and the compressor input power level off to constant values.

At time T10, the heat pump controller begins to adjust evaporator fan speed and compressor speed to reduce heat pump power consumption while providing the desired cabin temperature. In particular, the evaporator fan input power is increased a predetermined amount which causes the evaporator fan speed to increase. The predetermined amount may vary with desired cabin temperature and other heat pump operating conditions. The compressor speed is reduced by the proportional/integral controller that adjusts compressor speed to provide a desired compressor suction inlet pressure. The desired compressor suction inlet pressure may vary with desired cabin temperature and other heat pump operating conditions. The compressor input power is reduced to lower the compressor speed. The reduction in compressor power is compared to the increase in evaporator fan power. In this example, the increase in fan power is greater than the resulting decrease in compressor power that results from increasing the evaporator fan speed. Therefore, the controller determines that increasing evaporator fan speed is not beneficial in this example.

At time T11, the evaporator fan input power is returned to the power input to the evaporator fan at the time just before time T10. The compressor input power is increased to increased compressor speed so that a desired compressor suction inlet pressure is provided. The cabin heat request remains asserted and the heat condenser discharge temperature remains near the desired condenser discharge temperature.

At time T12, the evaporator fan input power is reduced a predetermined amount since increasing the evaporator input power did not result in a desired reduction in compressor power. The evaporator fan speed decreases in response to the reduction in evaporator fan input power. The compressor input power is increased a small amount to provide the desired compressor suction inlet pressure. The compressor speed is increased in response to the compressor input power being increased. The decrease in evaporator fan input power is compared to the increase in compressor input power. In this instance, the reduction in evaporator fan power is greater than the increase in compressor input power, but the condenser discharge temperature is reduced more than a desired amount. Therefore, at time T13, the evaporator fan power is returned to its input power level that was present just before time T12. The compressor input power is also reduced a time T13 in response to the reduction in condenser discharge temperature.

In this way, evaporator input power may be increased and decreased while compressor input power is monitored. If the desired level of cabin heating is provided after making an evaporator fan adjustment (e.g., increase or decrease in input power), and if there is a net power reduction between the evaporator fan and the compressor, the evaporator input power is maintained at the newly adjusted input power.

Figure 4:
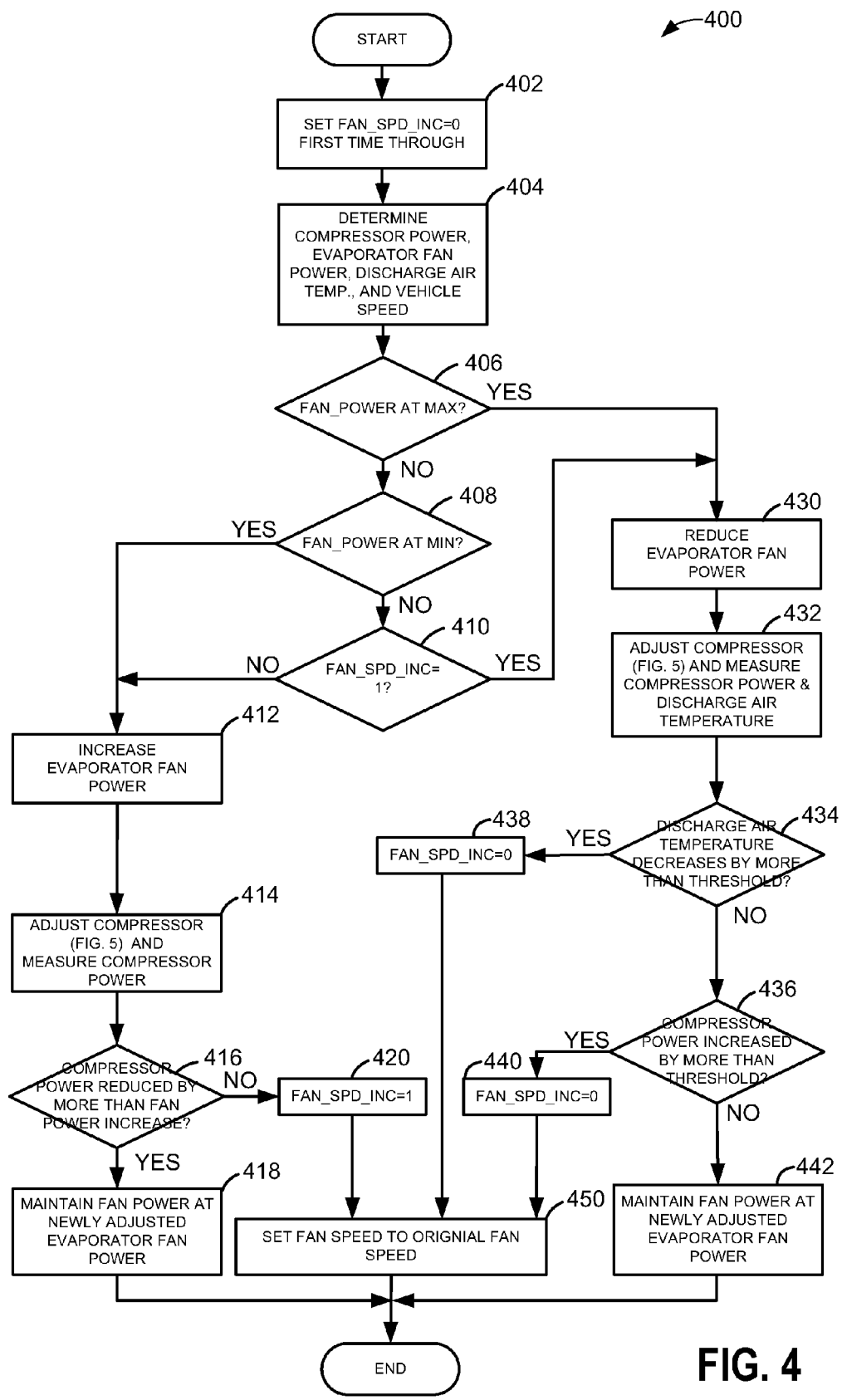
FIGS. 4 and 5 show an example method for operating a vehicle cabin heating system.

Referring now to FIG. 4, a method for operating a vehicle cabin heating system is shown. The method of FIG. 4 may be performed within the system of FIGS. 1 and 2 to provide the operating sequence of FIG. 3. The method of FIGS. 4 and 5 may also be stored as executable instructions in non-transitory memory of controller 212.

At 402, method 400 sets a value of variable FAN_SPD_INC to equal zero. The variable is used to determine whether the evaporator fan power should be increased or decreased to arrive at a desired heat pump power consumption level. The first time method 400 is executed the variable is set to a value of zero so that evaporator power is initially increased. Method 400 proceeds to 404 after the value of the variable is set.

At 404, method 400 determines operating conditions. In one example, operating conditions may include but are not limited to compressor input power, evaporator fan input power, condenser discharge temperature, and vehicle speed. In one example, current and voltage sensors determine current flow and voltage supplied to the compressor and the evaporator fan. Power supplied to the compressor and evaporator fan may be determined by multiplying the respective input current supplied to each device by the respective voltage supplied to each device. For example, compressor input power may be determined via multiplying compressor input current by compressor input voltage. Condenser discharge temperature is determined from a temperature sensor and vehicle speed is determined via a vehicle speed sensor. Method 400 proceeds to 406 after operating conditions are determined.

At 406, method 400 judges whether or not the evaporator fan is operating at a maximum output power. In one example, the evaporator fan may be determined to be providing maximum output when evaporator fan current is greater than a threshold current and when voltage supplied to the evaporator fan is greater than a threshold voltage. If method 400 judges that the evaporator fan is operating at its maximum output, the answer is yes and method 400 proceeds to 430. Otherwise, the answer is no and method 400 proceeds to 408.

At 408, method 400 judges whether or not the evaporator fan is operating at a minimum output power. If method 400 judges that the evaporator fan is operating at its minimum output, the answer is yes and method 400 proceeds to 412. Otherwise, the answer is no and method 400 proceeds to 410.

At 410, method 400 judges whether the value of variable FAN_SPD_INC is equal to one. If the variable value is one, the answer is yes and the evaporator fan power is to be increased so method 400 proceeds to 430. Otherwise, the answer is no and method 400 proceeds to 412.

At 412, method 400 increases evaporator fan input power. In one example, evaporator fan input power is incremented by a first predetermined amount of power. Evaporator fan input power may be increased via increasing current and/or voltage supplied to the evaporator fan. Additionally, the amount of fan power may be adjusted to account for air passing through the evaporator due to vehicle motion. For example, if fan power is to be increased by X watts and vehicle speed increases causing additional ambient air to flow across the evaporator due to the increase in vehicle speed, the fan power may be increased by X-Y watts, where Y is an amount of power equivalent to evaporator fan power to provide the additional flow across the evaporator due to the increase in vehicle speed. Thus, if fan power is to be increased by 30 watts and vehicle speed increases to provide additional flow through the evaporator equivalent to 10 watts of evaporator input power, evaporator fan power is increased by 20 watts so that the combined evaporator fan power and vehicle speed increases provides flow through the evaporator equivalent to increasing evaporator fan power by 30 watts.

Additionally, method 400 may open vehicle grill shutters depending on ambient temperature to pass air over the evaporator so that less evaporator fan power may be consumed. For example, if ambient temperature is relatively high (e.g., greater than 7° C.), cabin heat is requested, and opening the grill shutters will increase vehicle windage losses by a small amount (e.g., less than power consumed by operating the evaporator fan with grill shutters closed to provide the desired cabin heat), method 400 may open grill shutters at 412. Method 400 proceeds to 414 after evaporator fan speed is adjusted.

At 414, method 400 adjusts compressor speed and/or swash plate position to provide a desired suction pressure at the compressor's suction inlet. In one example, the compressor is adjusted according to the method of FIG. 5. Method 400 proceeds to 416 after the compressor is adjusted.

At 416, method 400 judges whether or not the adjustment to the compressor decreases compressor input power more than the first predetermined amount of power input to the evaporator fan. In one example, the decrease in input power to the compressor is subtracted from the increase in input power to the evaporator fan. If the result is positive, the answer is yes and method 400 proceeds to 418. Otherwise, the answer is no and method proceeds to 420.

At 420, method 400 sets the variable FAN_SPD_INC to a value of one so that evaporator fan power may be reduced to determine if heat pump power may be reduced by reducing evaporator fan power. Method 400 proceeds to 450 after the variable value is adjusted.

At 450, method 400 adjusts the evaporator fan speed to the evaporator fan speed before power to the evaporator fan was increased at 412 if the evaporator fan power was increased. However, if the evaporator fan power was decreased, the fan speed is adjusted to the fan speed before power to the evaporator fan was decreased at 430. Method 400 proceeds to exit after fan speed is adjusted.

At 418, method 400 maintains evaporator fan power at the present evaporator fan power. For example, evaporator fan power is maintained at the level that includes the predetermined first amount of power. Further, is should be noted that method 400 may be executed a plurality of times so that the evaporator fan power may be incremented a plurality of times, thereby increasing evaporator operator power in a plurality of steps when increasing evaporator power input decreases power input to the compressor by more than the first predetermined amount of power. Method 400 proceeds to exit after evaporator fan power is maintained at its present level.

At 430, method 400 decreases evaporator fan input power. In one example, evaporator fan input power is decremented by a first predetermined amount of power. Evaporator fan input power may be decreased via decreasing current and/or voltage supplied to the evaporator fan. Additionally, the amount of fan power may be adjusted to account for air passing through the evaporator due to vehicle motion. For example, if fan power is to be decreased by X watts and vehicle speed decreases causing less ambient air to flow across the evaporator due to the decrease in vehicle speed, the fan power may be decreased by X-Y watts, where Y is an amount of power equivalent to evaporator fan power to provide less flow across the evaporator due to the decrease in vehicle speed. Thus, if fan power is to be decreased by 30 watts and vehicle speed decreases to provide less flow through the evaporator equivalent to 10 watts of evaporator input power, evaporator fan power is decreased by 20 watts so that the combined evaporator fan power and vehicle speed decrease provides flow through the evaporator equivalent to decreasing evaporator fan power by 30 watts. Method 400 proceeds to 432 after evaporator fan speed is adjusted.

At 432, method 400 adjusts compressor speed to provide a desired suction pressure at the compressor's suction inlet. In one example, the compressor is adjusted according to the method of FIG. 5. Additionally, method 400 determines condenser discharge temperature at 432. In one example, condenser discharge temperature is determined via a discharge temperature sensor. Method 400 proceeds to 434 after the compressor is adjusted.

At 434, method 400 judges whether or not the condenser discharge air temperature is decreased by more than a threshold amount. The threshold amount may vary with heat pump operating conditions. If method 400 judges that the condenser discharge air temperature is decreased by more than the threshold amount, the answer is yes and method 400 proceeds to 438. Otherwise, the answer is no and method 400 proceeds to 436.

At 438, method 400 sets the value of variable FAN_SPD_INC to zero. By setting the variable to a value of zero, evaporator fan power may be increased to determine if increasing evaporator fan power will reduce compressor power consumption. Method 400 proceeds to 450 after the variable's value is adjusted.

At 436, method 400 judges whether or not the adjustment to the compressor increases compressor input power to more than the first predetermined amount of power that is reduced to the evaporator fan. In one example, the increase in input power to the compressor is subtracted from the decrease in input power to the evaporator fan. If the result is positive, the answer is no and method 400 proceeds to 442. Otherwise, the answer is no and method proceeds to 440.

At 440, method 400 sets the value of variable FAN_SPD_INC to zero. By setting the variable to a value of zero, evaporator fan power may be increased to determine if increasing evaporator fan power will reduce compressor power consumption. Method 400 proceeds to 450 after the variable's value is adjusted.

At 442, method 400 maintains evaporator fan power at the present evaporator fan power. That is, evaporator fan power is maintained at the level that is supplied to the evaporator fan when the predetermined first amount of power is removed from the evaporator fan. Method 400 proceeds to exit after evaporator fan power is maintained at its present level.

Figure 5:
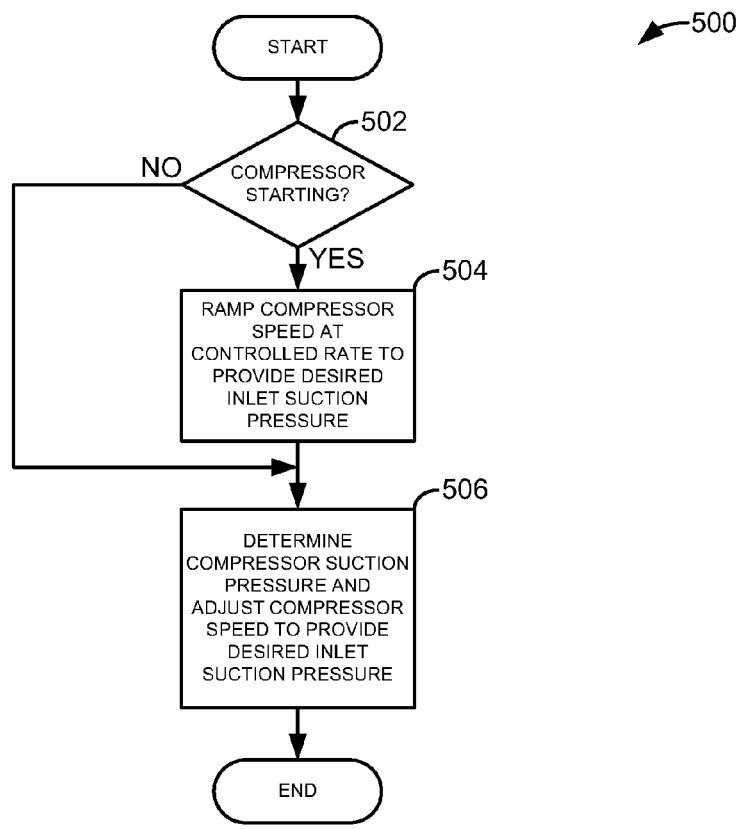

Referring now to FIG. 5, a method for adjusting input power to a heat pump compressor is shown. The method of FIG. 5 may be used with the method of FIG. 4 to operate the system shown in FIGS. 1 and 2.

At 502, method 500 judges whether or not the compressor is starting. In one example, the compressor may be determined to be starting based on a request for vehicle cabin heat being asserted and a timer indicating that less than a threshold amount of time has transpired since the cabin heat request was asserted. If there is a request for vehicle cabin heat and the timer indicates less than the threshold amount of time has occurred, the answer is yes and method 500 proceeds to 504. Otherwise, the answer is no and method 500 proceeds to 506.

At 504, method 500 ramps compressor speed at a controlled rate to a speed that is expected to provide a desired suction pressure at a suction inlet of the compressor. However, due to refrigerant temperature, manufacturing variation, and other conditions the compressor speed may be higher or lower than a speed that provides the desired suction pressure. In one example, compressor speed is commanded to follow a predetermined ramping profile. If compressor speed is less than or greater than desired, a proportional/integral controller adjusts the compressor voltage and/or current to adjust compressor speed. In examples that include a swash plate, the swash plate may be commanded to a fixed position while compressor speed is ramped. Method 500 proceeds to 506 after compressor speed is ramped.

At 506, method 500 determines compressor inlet suction pressure and adjusts compressor speed to provide the desired inlet suction pressure. In one example, a function or table outputs a compressor speed based on a desired compressor suction inlet pressure. The compressor is adjusted to the speed output by the table and a proportional/integral controller further adjusts compressor speed in response to the compressor suction inlet pressure. In particular, if the compressor suction inlet pressure is lower than a desired suction inlet pressure, the compressor speed is reduced to increases the suction inlet pressure. If the compressor suction inlet pressure is higher than the desired suction inlet pressure, the compressor speed is increased to decrease the suction inlet pressure.

In systems where the compressor includes a swash plate, the compressor speed and the swash plate position may be adjusted to provide the desired compressor suction inlet pressure. Further, the desired compressor suction inlet pressure may be adjusted for different heat pump operating conditions such as ambient air temperature, desired cabin temperature, and desired heat pump power consumption. In one example, swash plate position and compressor speed are output from empirically determined functions or table values that are based on a desired compressor inlet suction pressure. Proportional/integral controllers adjust compressor speed and swash plate position to provide closed-loop feedback compressor suction inlet pressure control. Method 500 proceeds to exit after compressor speed and/or swash plate positions are adjusted.

Thus, the method of FIGS. 4 and 5 provides for operating heat pump of a vehicle, comprising: increasing an evaporator cooling fan input power by a first amount to a first input power and maintaining the evaporator cooling fan input power at the first input power in response to compressor input power decreasing by more than the first amount. The method includes where the compressor input power is reduced in response to a suction inlet pressure of the compressor.

In some examples, the method further comprises reducing a speed of the compressor in response to decreasing compressor input power. The method further comprises adjusting a position of a swash plate to decrease compressor input power. The method includes where a speed of the compressor is maintained at a constant speed while the position of the swash plate is adjusted. The method further comprises decreasing the evaporator cooling fan input power in response to the compressor input power decreasing by less than the first amount. The method includes where the evaporator cooling fan input power is increased to increase a speed of the evaporator cooling fan.

The method of FIGS. 4 and 5 also provides for operating heat pump of a vehicle, comprising: decreasing an evaporator cooling fan input power by a first amount to a first input power and maintaining the evaporator cooling fan input power at the first input power in response to compressor input power not increasing by more than the first amount. The method further comprises maintaining the evaporator cooling fan input power in response to a condenser discharge temperature change not decreasing by greater than a threshold temperature. The method further comprises increasing the evaporator cooling fan input power in response to the compressor input power increasing by more than the first amount.

In one example, the method further comprises increasing the evaporator cooling fan input power in response to a condenser discharge temperature decrease being greater than a threshold temperature. The method includes where the compressor speed is adjusted via adjusting the compressor input power. The method includes where the compressor input is adjusted in response to adjusting a position of a swash plate to provide a desired compressor suction inlet pressure. The method further comprises ramping compressor speed to provide a desire pressure at an inlet of the compressor during compressor starting.

As will be appreciated by one of ordinary skill in the art, method described in FIGS. 4 and 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, full electric or partially electric driven powertrains could use the present description to advantage.

The invention claimed is:

1. A method for operating a vehicle heat pump, comprising:
adjusting an evaporator cooling fan input power and a compressor input power to provide a desired level of cabin heat;
increasing the evaporator cooling fan input power by a first amount to a first input power;
decreasing the compressor input power in response to increasing the evaporator cooling fan input power;
maintaining the evaporator cooling fan input power at the first input power in response to a determination that compressor input power is decreasing by more than the first amount while providing the desired level of cabin heat; and
responsive to an increase in vehicle windage losses being less than an amount of power consumed by operating an evaporator fan with grill shutters closed, opening the grill shutters to increase air flow across an evaporator of the vehicle heat pump to provide the desired level of cabin heat.

2. The method of claim 1, where the compressor input power is reduced in response to a determined suction inlet pressure of a compressor.

3. The method of claim 1, further comprising reducing a speed of a compressor in response to a determined decreasing compressor input power.

4. The method of claim 1, further comprising adjusting the evaporator cooling fan input power in response to a determined vehicle speed.

5. The method of claim 4, further comprising determining a compressor suction inlet pressure and adjusting compressor speed to provide a desired compressor suction inlet pressure.

6. The method of claim 1, further comprising decreasing the evaporator cooling fan input power in response to a determined compressor input power decreasing by less than the first amount.

7. The method of claim 1, where the evaporator cooling fan input power is increased to increase a speed of an evaporator cooling fan.

8. A method for operating a vehicle heat pump, comprising:
decreasing an evaporator cooling fan input power by a first amount to a first input power and maintaining the evaporator cooling fan input power at the first input power in response to a determined compressor input power not increasing by more than the first amount to maintain a desired cabin temperature;
increasing the evaporator cooling fan input power in response to the determined compressor input power increasing by more than the first amount to maintain the desired cabin temperature; and
maintaining the evaporator cooling fan input power in response to a determined condenser discharge temperature change not decreasing by greater than a threshold temperature.

9. The method of claim 8, further comprising increasing the evaporator cooling fan input power in response to the determined compressor input power increasing by more than the first amount.

10. The method of claim 8, further comprising increasing the evaporator cooling fan input power in response to the determined condenser discharge temperature change being greater than the threshold temperature.

11. The method of claim 8, further comprising adjusting the evaporator cooling fan input power based on a difference in a determined evaporator power and an evaporator fan power to provide a flow across an evaporator equivalent to a flow across the evaporator due to vehicle speed.

12. The method of claim 11, further comprising selectively opening grill shutters in response to ambient temperature when opening the grill shutters will increase vehicle windage losses by less than an amount of power consumed by operating an evaporator fan with the grill shutters closed to provide the desired cabin temperature.

13. The method of claim 8, further comprising ramping compressor speed to provide a desired pressure at an inlet of a compressor during compressor starting.

14. A method for operating a vehicle heat pump, comprising:
decreasing an evaporator cooling fan input power by a first amount to a first input power and maintaining the evaporator cooling fan input power at the first input power in response to a determined compressor input power not increasing by more than the first amount to maintain a desired cabin temperature;
increasing the evaporator cooling fan input power in response to the determined compressor input power increasing by more than the first amount to maintain the desired cabin temperature; and
further comprising increasing the evaporator cooling fan input power in response to a determined condenser discharge temperature decrease being greater than a threshold temperature.

* * * * *